United States Patent
Sawada et al.

(10) Patent No.: US 7,266,090 B2
(45) Date of Patent: Sep. 4, 2007

(54) ADDRESS AUTOCONFIGURATION METHOD FOR HOME NETWORK

(75) Inventors: Sunao Sawada, Yokohama (JP); Akihiro Ebina, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 980 days.

(21) Appl. No.: 10/412,123

(22) Filed: Apr. 10, 2003

(65) Prior Publication Data
US 2004/0028061 A1 Feb. 12, 2004

(30) Foreign Application Priority Data
May 28, 2002 (JP) ............................. 2002-153258

(51) Int. Cl.
*H04L 12/28* (2006.01)
(52) U.S. Cl. ..................... 370/254; 370/328; 370/389
(58) Field of Classification Search ..................... None
See application file for complete search history.

(56) References Cited
U.S. PATENT DOCUMENTS
6,480,900 B1 * 11/2002 Habert ....................... 709/245
2003/0018733 A1 * 1/2003 Yoon et al. ................. 709/208

FOREIGN PATENT DOCUMENTS
JP 2001-230783 A 8/2001
JP 2002-141953 A 5/2002

OTHER PUBLICATIONS

Perkins, "Mobile IP", IEEE Communication Magazine, 1997, pp. 84.*
Narten, "Neighbor Discovery and Stateless Autoconfiguration in IPv6", IEEE Internet Computing, 1999, pp. 54.*
Narten et al., "RFC 2461—Neighbor Discovery for IPv6", 1998, pp. 1.*
G. McGregor, "PPP IPCP," RFC1332 (May 1992), pp. i-ii, 1-12.
Droms, "Dynamic Host Configuration Protocol," RFC1531 (Oct. 1993), pp. 29-34.
Thomson & Narten, "IPv6 Stateless Address Autoconfiguration," RFC2462 (Dec. 1998), pp. 16-19.

* cited by examiner

*Primary Examiner*—Chau Nguyen
*Assistant Examiner*—Jung Park
(74) *Attorney, Agent, or Firm*—Townsend and Townsend and Crew LLP

(57) ABSTRACT

A network in which a plurality of network apparatuses are mutually connected. The network has at least one internetwork forwarding apparatus which connects an external network and the network. The internetwork forwarding apparatus automatically allocates addresses to the plurality of network apparatuses connected to the network. Names of the network apparatuses, the addresses automatically allocated to the network apparatuses, and types of the network apparatuses are recorded into a nonvolatile storage medium. A filtering rule of a network packet of the internetwork forwarding apparatus are automatically created on the basis of recorded information.

11 Claims, 13 Drawing Sheets

FIG.5

| # | DIRECTION | OPERATION | PROTOCOL | SOURCE ADDRESS | SOURCE PORT | DESTINATION ADDRESS | DESTINATION PORT | FLAG/TYPE | ENCRYPTION/ AUTHENTICATION |
|---|---|---|---|---|---|---|---|---|---|
| 5 | INPUT | DISCARD | any | 3FFE:FFFF:1111:1111::/64 | any | any | any | any | any |
| 11 | INPUT | FORWARD | any | any | any | 3FFE:FFFF:1111:1111: 2222:22FF:FE22:8888 | any | any | any |
| 10 | OUTPUT | FORWARD | any | 3FFE:FFFF:1111:1111: 2222:22FF:FE22:8888 | any | any | any | any | any |
| 9 | INPUT | FORWARD | TCP | any | any | 3FFE:FFFF:1111:1111: 2222:22FF:FE22:2222 | 80 | any | any |
| 8 | OUTPUT | FORWARD | TCP | 3FFE:FFFF:1111:1111: 2222:22FF:FE22:2222 | 80 | any | any | THERE IS ACK | any |
| 7 | OUTPUT | FORWARD | TCP | 3FFE:FFFF:1111:1111: 2222:22FF:FE22:6666 | any | any | any | any | any |
| 6 | INPUT | FORWARD | TCP | any | any | 3FFE:FFFF:1111:1111: 2222:22FF:FE22:6666 | any | THERE IS ACK | none |
| 4 | OUTPUT | FORWARD | ICMPv6 | 3FFE:FFFF:1111:1111::FFFF | any | any | any | any | any |
| 3 | OUTPUT | FORWARD | ICMPv6 | FE80::0202 | any | FE80::0101 | any | 138 | AH |
| 2 | INPUT | FORWARD | ICMPv6 | FE80::0101 | any | FE80::0202 | any | 138 | AH |
| 1 | OUTPUT/ INPUT | DISCARD | any | any | any | any | any | any | any |

| # | LINK LOCAL ADDRESS | GLOBAL ADDRESS | type | NAME | REGISTRATION TIME | UPDATING TIME |
|---|---|---|---|---|---|---|
| 1 | FE80::FFFF | 3FFE:FFFF:1111:1111::FFFF | HGW | HOME GATEWAY | 12:34:56 | 12:34:56 |
| 2 | FE80::2222:22FF:FE22:2222 | 3FFE:FFFF:1111:1111:2222:22FF:FE22:2222 | HOUSEHOLD APPLIANCE | AIR CONDITIONER | 15:15:15 | 15:15:15 |

FIG.10

PROXY ADDRESS TABLE

1911

| CONNECTOR | REGISTRATION | CONNECTION | ID | GLOBAL ADDRESS | LINK LOCAL ADDRESS |
|---|---|---|---|---|---|
| A | Y | Y | 0102:0304:0506:0708 | 3ffe:ffff:1111:1111 :0102:0304:0506:0708 | fe80::0102:0304:0506:0708 |
| B | N | N | 0102:0304:0506:090A | 0:0 | 0:0 |
| C | N | N | 0102:0304:0506:0B0C | 0:0 | 0:0 |

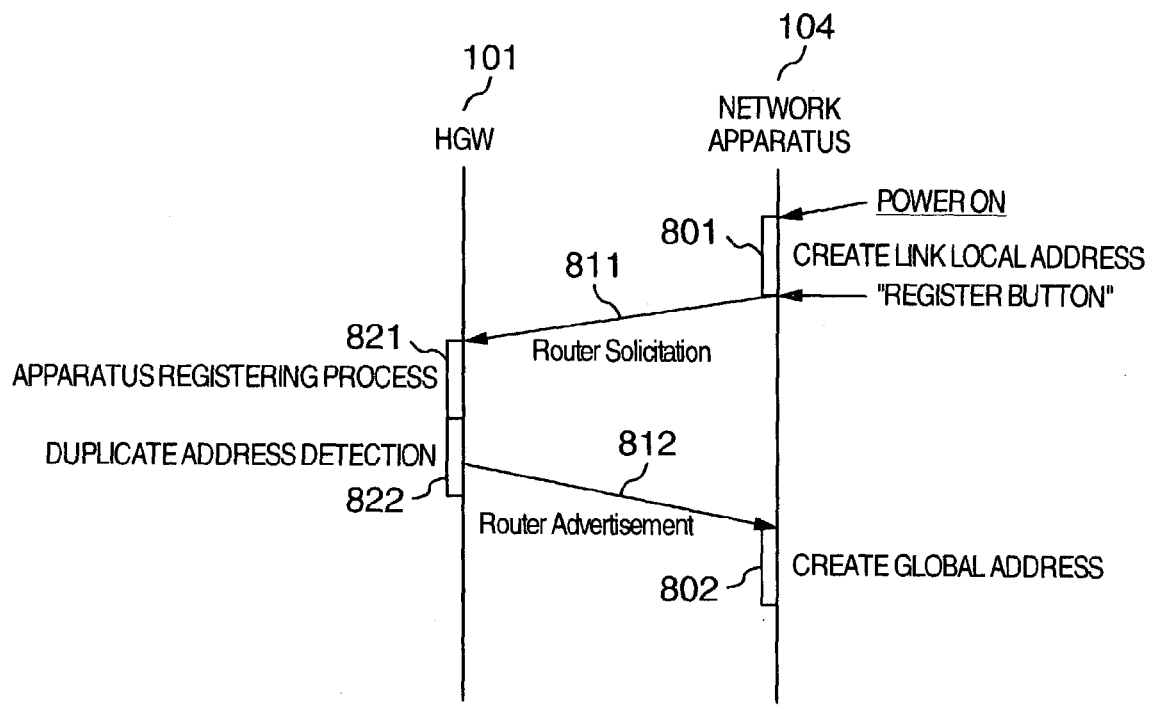
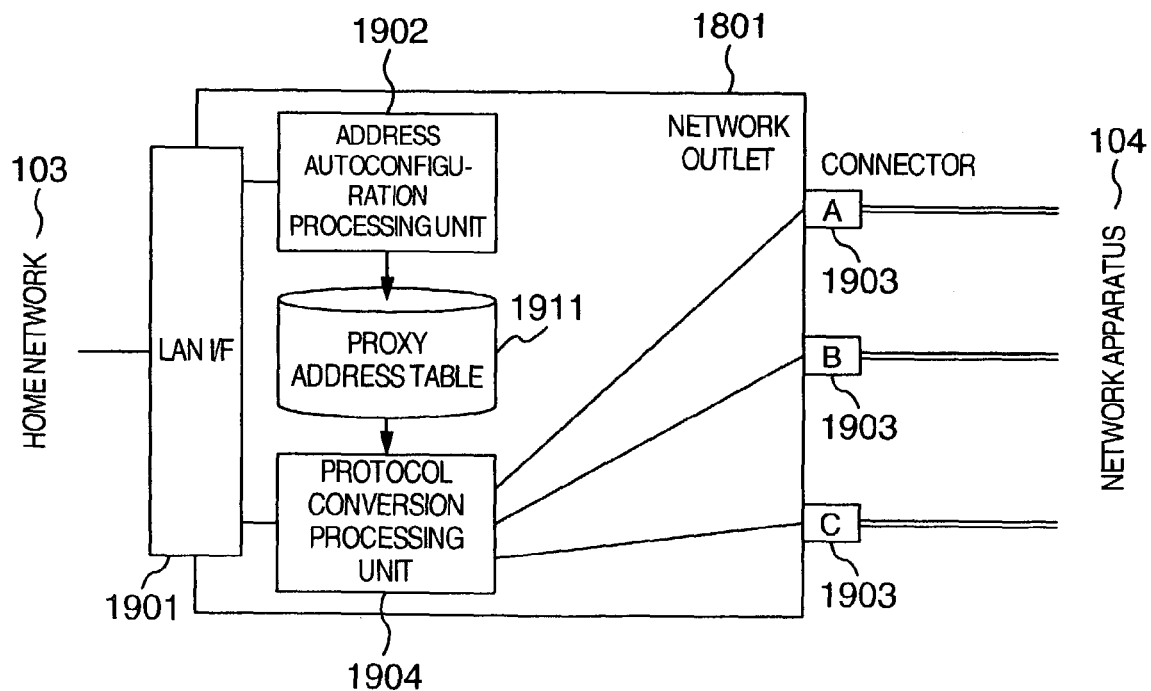

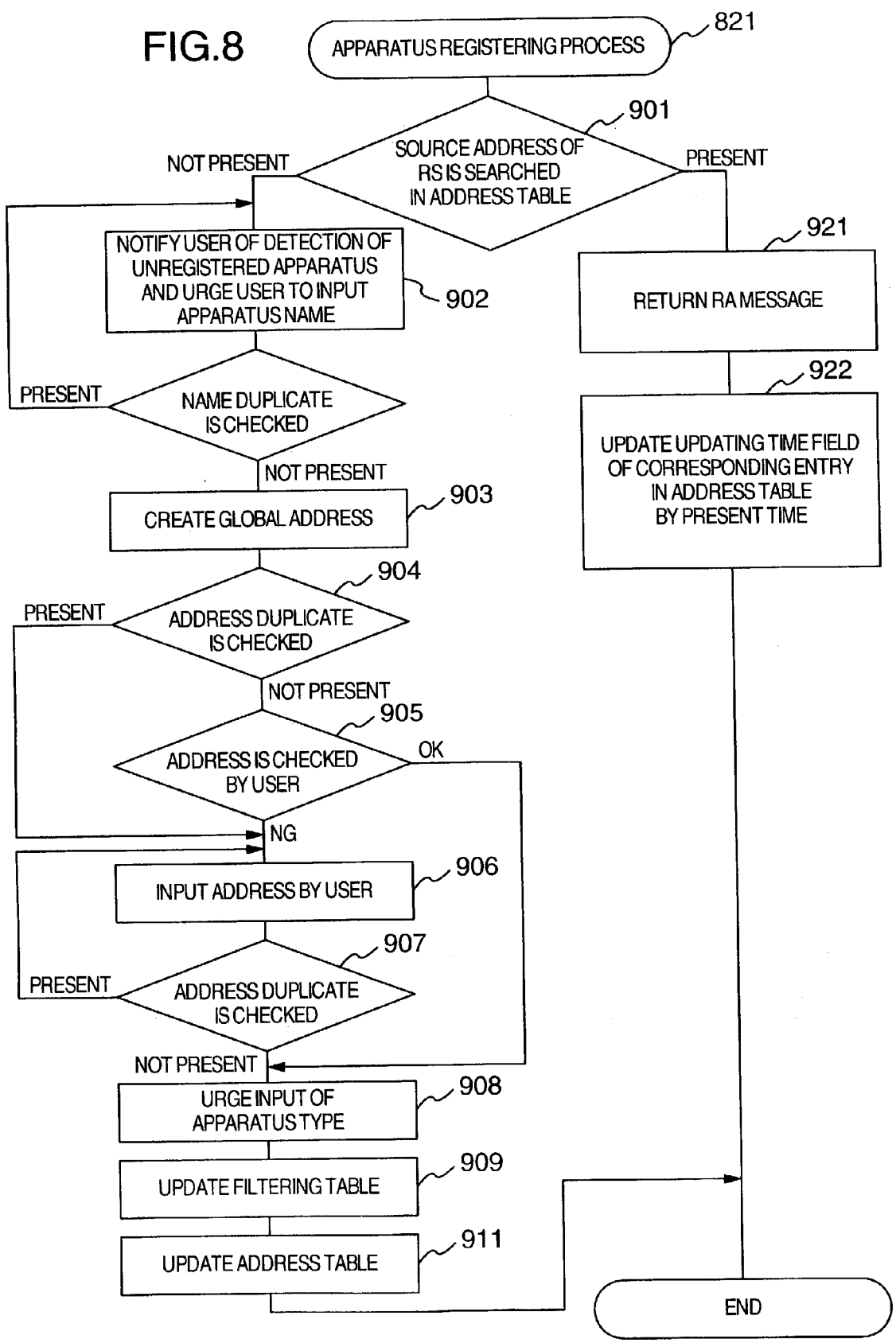

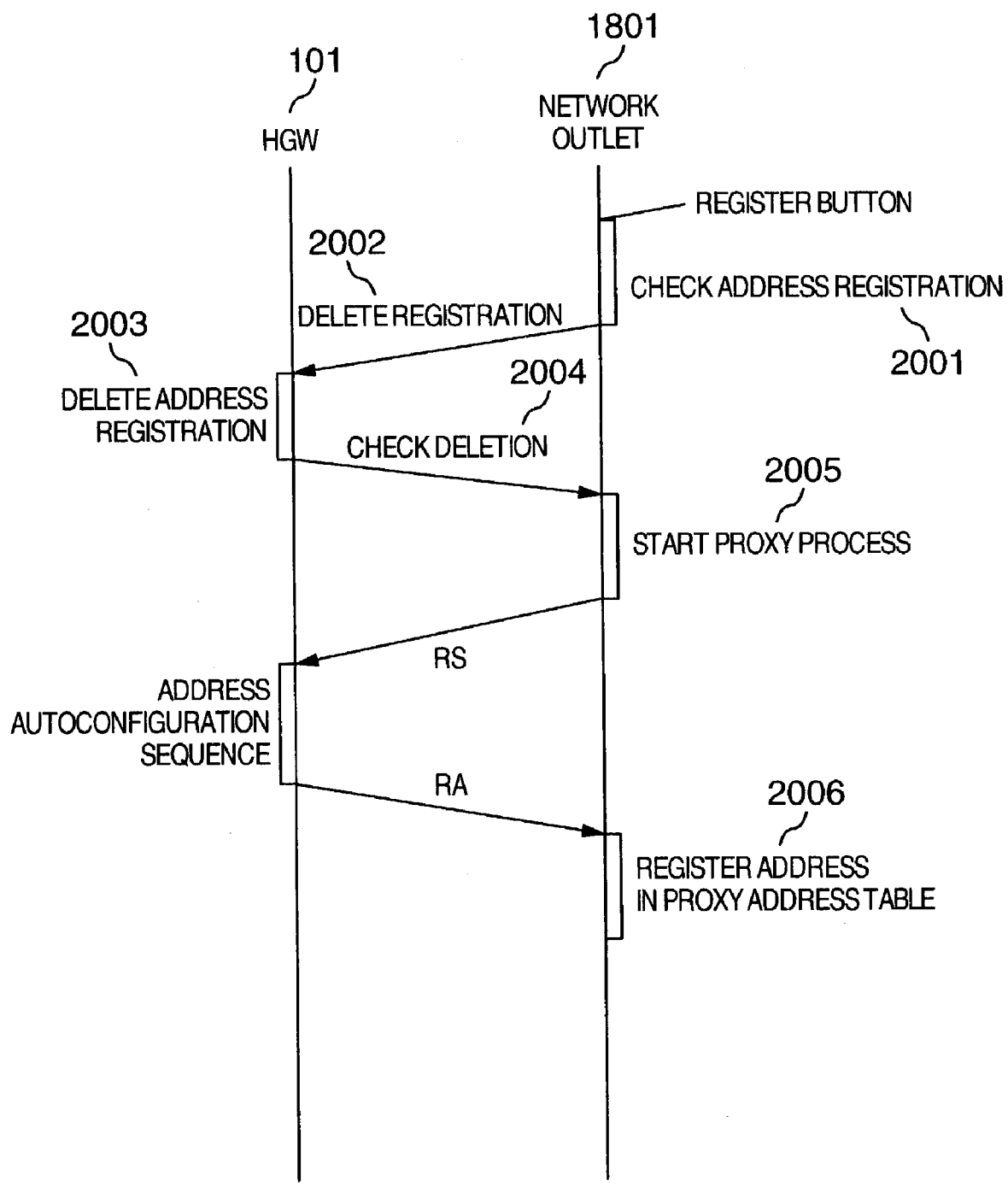

ADDRESS AUTOCONFIGURATION METHOD FOR HOME NETWORK

BACKGROUND OF THE INVENTION

The invention relates to a data communication network and, more particularly, to a method of automatically creating correspondence relationships between apparatus names and addresses, and a filtering rule, which are interlocked with address autoconfiguration of network apparatuses.

In a data communication network represented by the Internet, it is necessary to allocate an address to each network apparatus which communicates via the network. The address which is allocated to such a network apparatus needs to be a correct address which is not duplicated in the same network and conforms with a protocol specification.

As address configuration methods, there are a method wherein a general user manually sets the addresses of the network apparatuses and a method wherein the addresses are automatically set among the network apparatuses.

The following methods have been proposed with respect to the address autoconfiguration. In a case where there is one apparatus and it is connected to a server in a one-to-one correspondence relationship, address allocation by the PPP (Point-to-Point Protocol) is generally used. As a method of automating the address configuration to a plurality of apparatuses, the DHCP (Dynamic Host Configuration Protocol) has been standardized in the IP (Internet Protocol), and the NDP (Neighbor Discovery Protocol) has been standardized in the IPv6. Those protocols enable correct addresses to be automatically allocated to the apparatuses without the user's concern.

If the address configuration according to the above-mentioned art is used, first, in the method wherein the general user manually sets the addresses, there is a case where a communication trouble is caused by erroneous setting due to complicatedness of techniques regarding connection of the network apparatuses or necessity of special knowledge.

Next, in the method wherein the addresses are automatically set among the network apparatuses, until the network apparatuses are actually connected to the network or until power sources are turned on, the addresses which are allocated to the network apparatuses cannot be specified. Therefore, a database which needs the addresses of the network apparatuses as information cannot be previously set. As examples of such a kind of database, a filtering table in which whether a packet is forwarded or discarded in a router is determined and a table holding correspondence relationships between apparatus names and the addresses for name resolution by the DNS (Domain Name System) can be mentioned.

Since those databases cannot be previously set, when the network apparatuses are actually connected to the network and the addresses of the network apparatuses are specified, a setting operation of those databases has to be executed to the router or a DNS server. However, since the special knowledge of the network is necessary for the setting of those databases, it is difficult for the general user to do it.

SUMMARY OF THE INVENTION

In consideration of the above drawbacks, it is an object of the invention to provide a network system in which in a network represented by a home network, addresses are automatically allocated to network apparatuses and setting of correspondence relationships between apparatus names and the addresses for name resolution and setting of a filtering table are automatically performed.

According to an aspect of the invention, there is provided a network system in which an internetwork forwarding apparatus which connects a plurality of networks records an address table and a filtering table into a nonvolatile storage medium and automatically executes an address autoconfiguration to network apparatuses for communicating via the networks, registration of correspondence relationships between apparatus names and addresses and setting of the filtering table, thereby enabling the user to use the network system without needing any special process. The internetwork forwarding apparatus mentioned here is, for example, a home gateway or the like.

According to another aspect of the invention, there is provided a network in which a network apparatus connecting apparatus which connects network apparatuses to the network notifies an internetwork forwarding apparatus of information necessary for setting of a filtering table in place of the network apparatus without an address autoconfiguration function, thereby automatically performing the address configuration and setting of an address table and the filtering table in a manner similar to the network apparatus corresponding to the address autoconfiguration. The network apparatus connecting apparatus mentioned here is, for example, a network outlet or the like. The network apparatuses mentioned here are, for example, a refrigerator, an air conditioner, and the like.

Still another aspect of the invention, there is provided a network system in which unique IDs are provided for network apparatuses and a network apparatus connecting apparatus notifies the network apparatuses of information necessary for setting a filtering table by using the IDs, thereby allocating the same addresses to the network apparatuses and minimizing the number of times of name registration and resetting of the filtering table.

Other objects, features and advantages of the invention will become apparent from the following description of the embodiments of the invention taken in conjunction with the accompanying drawings.

BRIEF DESCRIPTION OF THE DRAWINGS

FIG. 5 is a constructional diagram of a filtering table 211;

FIG. 6 is a constructional diagram of an address table 212;

FIG. 7 is an address autoconfiguration sequence diagram in the first embodiment;

FIG. 8 is a flowchart for an apparatus registering process in the first embodiment;

FIG. 9 is a functional block diagram of a network outlet 1801 in the first embodiment;

FIG. 10 is a constructional diagram of a proxy address table 1911;

FIG. 11 is an address autoconfiguration proxy sequence diagram in the first embodiment;

DESCRIPTION OF THE EMBODIMENTS

The first embodiment of the invention will be described.

Figure 1:
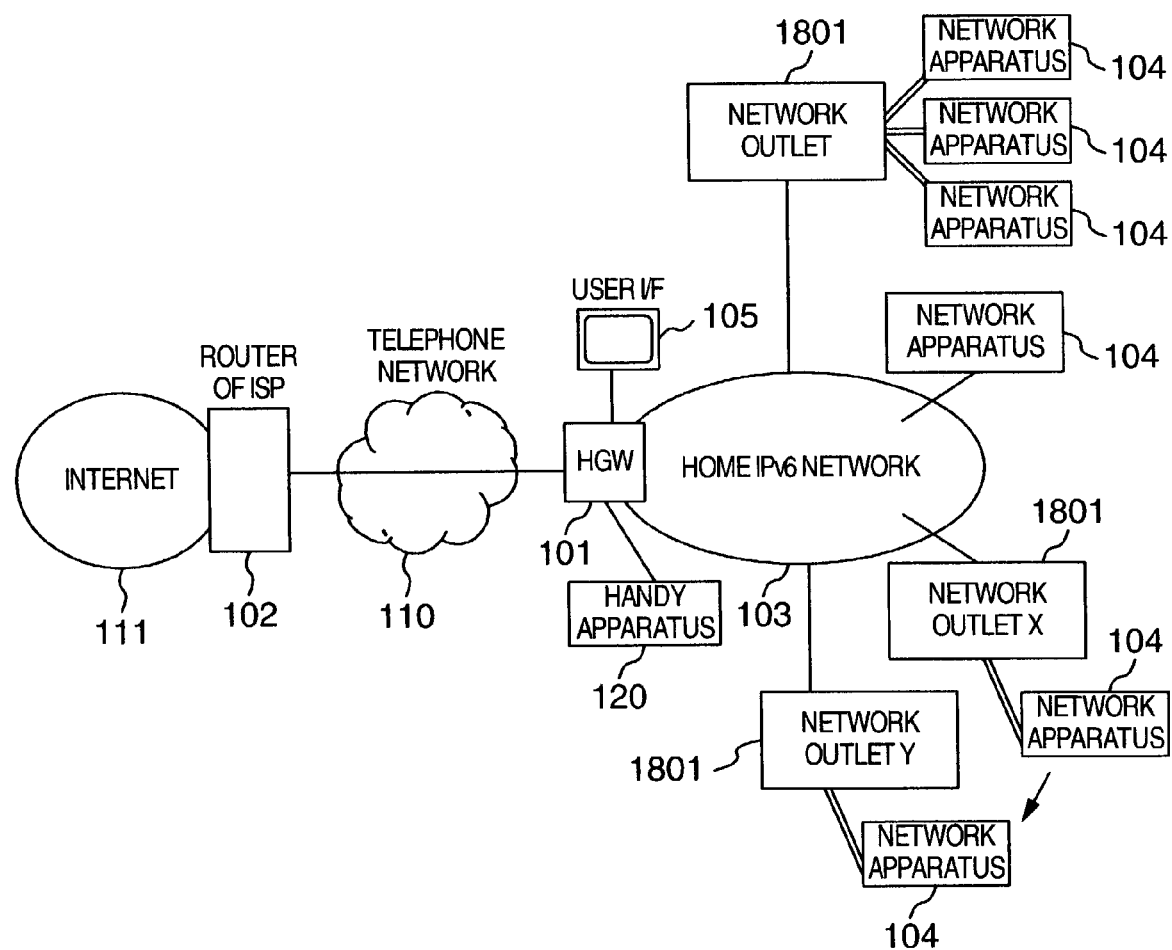
FIG. 1 is a constructional diagram of a home network 103 regarding the invention.

FIG. 1 shows a network construction in the first embodiment. A home network 103 in the embodiment is a network which is mutually connected to a plurality of network apparatuses 104 and can make communication according to an IPv6 protocol. An HGW (Home Gateway) 101 is an internetwork forwarding apparatus for forwarding an IPv6 packet between the home network 103 and the Internet 111 and makes an address autoconfiguration of the network apparatuses 104 connected to the home network 103. In the HGW 101 in the embodiment, the Internet side is connected to a router 102 of an Internet Service Provider (hereinafter, referred to as an ISP) by a telephone network 110 and the home side is directly connected to the home network 103. The HGW 101 has user interface means 105 for presenting information to the user and inputting the information from the user.

Figure 2:
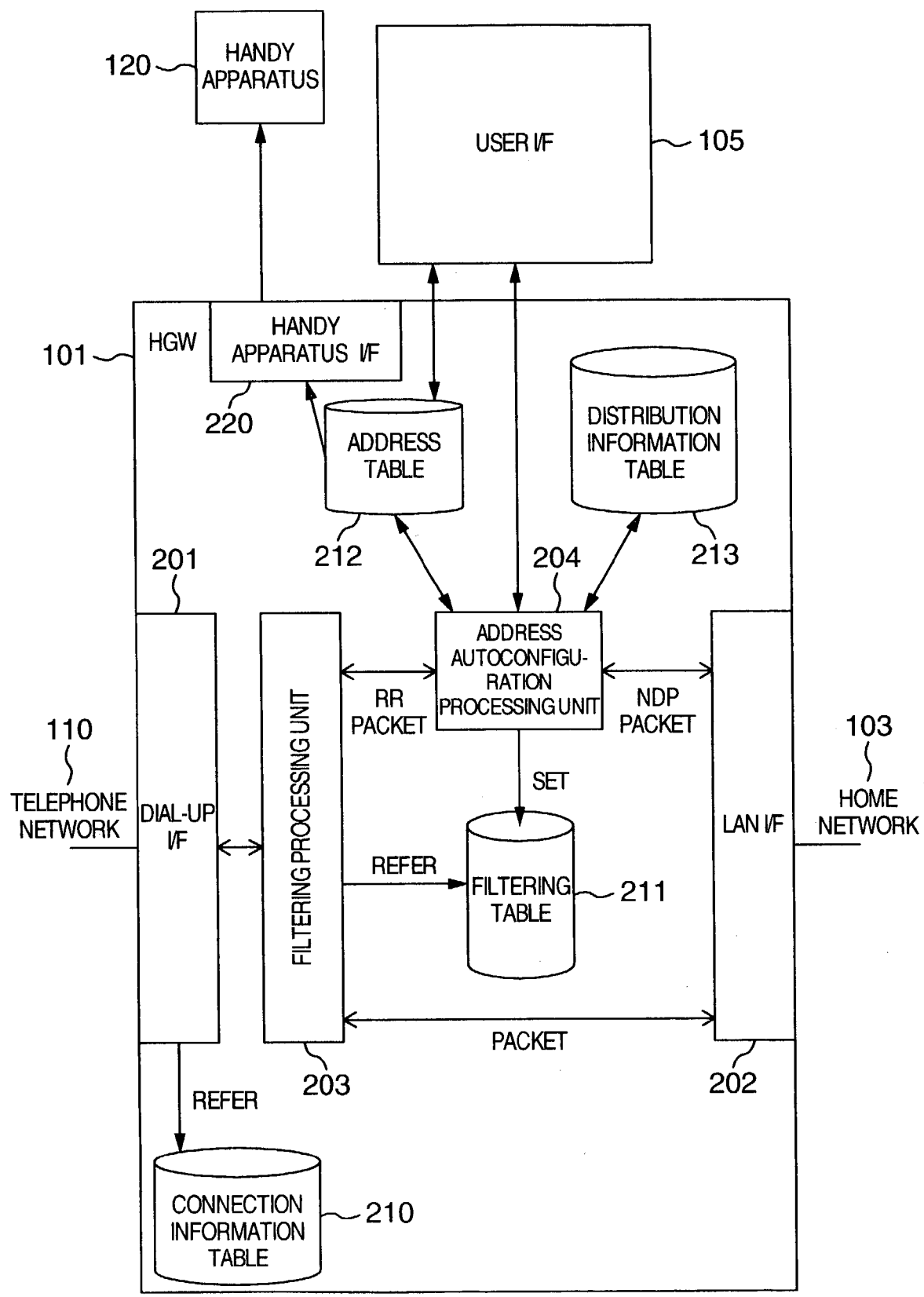
FIG. 2 is a functional block diagram of an HGW 101 regarding the invention.

A functional block diagram of the HGW 101 according to the invention is shown in FIG. 2. A forwarding process of the HGW 101 comprises: a process for transmitting packets received by a dial-up interface 201 from a LAN interface 202 via a filtering processing unit 203; and a process for transmitting the packets received by the LAN interface 202 from the dial-up interface 201 via the filtering processing unit 203.

The filtering processing unit 203 compares each of the packets to be forwarded with conditions registered in a filtering table 211 and determines whether the packets are actually forwarded or discarded on the basis of a result of the comparison.

An address autoconfiguration processing unit 204 makes an address autoconfiguration to the network apparatuses 104 connected to the home network 103 by using the NDP (Neighbor Discovery Protocol) standardized in the IETF. The address autoconfiguration processing unit 204 also performs management and setting of the filtering table 211 and an address table 212 of the HGW 101. An NDP message as a packet necessary for the address autoconfiguration process is directly received by the LAN interface 202 and the address autoconfiguration processing unit 204 without passing through the filtering processing unit 203.

A handy apparatus interface 220 is an interface for directly connecting a handy apparatus 120 to the HGW 101 and has a function for transmitting contents of the address table 212 to the handy apparatus 120.

Figure 3:
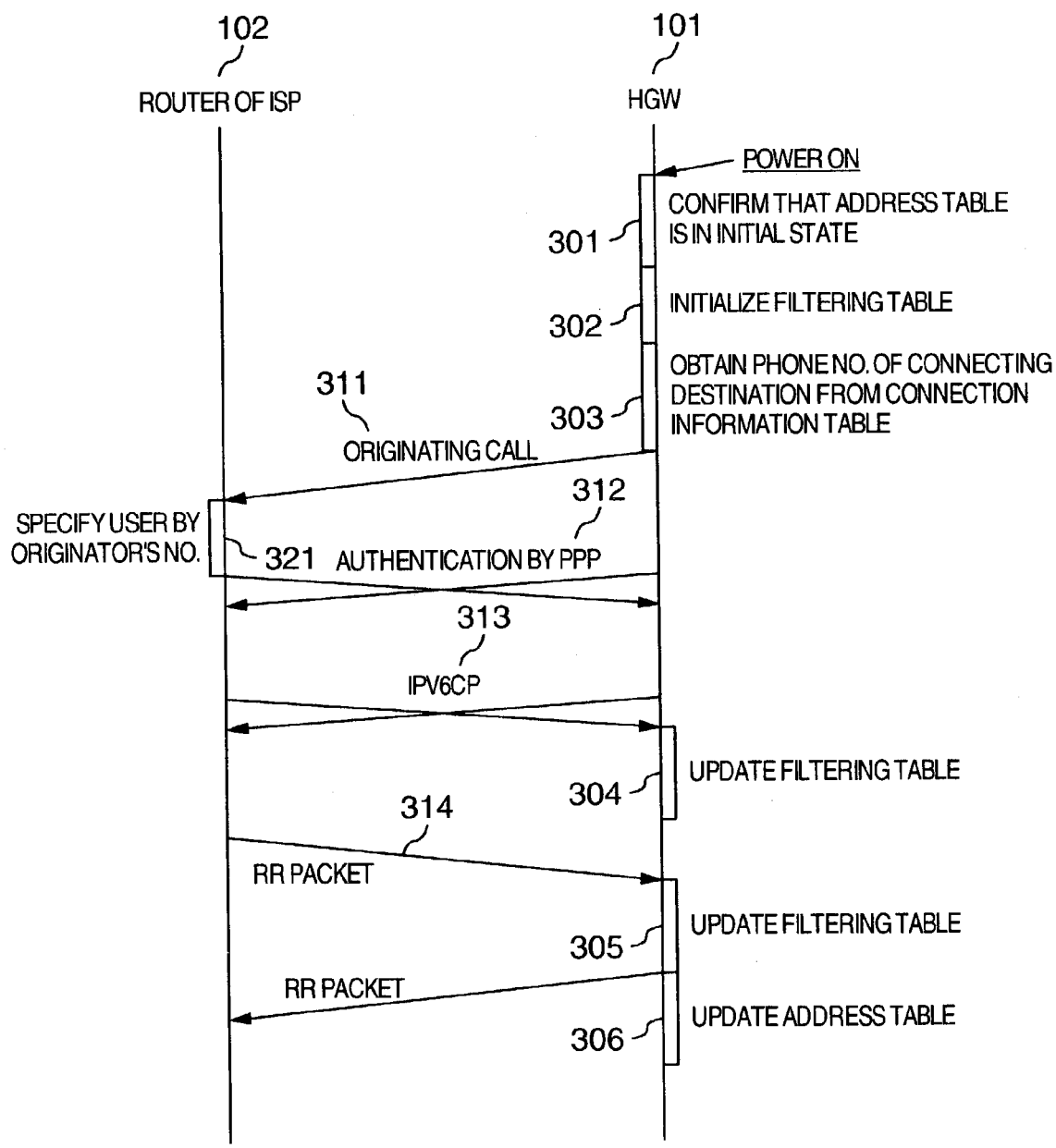
FIG. 3 is a prefix obtaining sequence diagram in the first embodiment.
Figure 4:
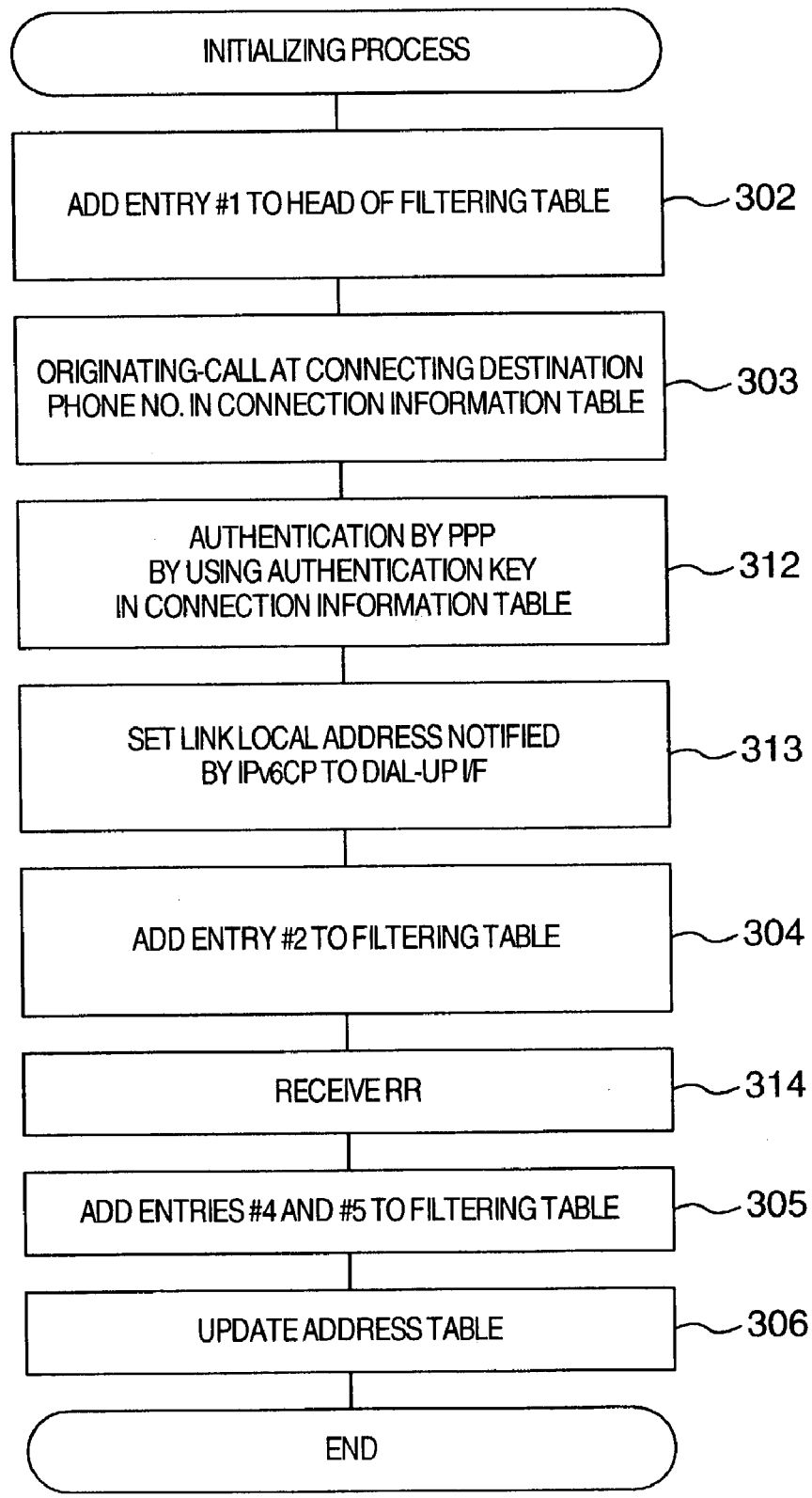
FIG. 4 is a functional block diagram of the HGW 101 in the first embodiment.

The HGW 101 receives an allocated network prefix for the home network 103 from the ISP by the router 102 of the ISP and sets an address belonging to the network prefix for the home network 103 into each network apparatus 104 connected to the home network 103 so as not to be duplicated among the network apparatuses 104. In the embodiment, distribution of the network prefix from the router 102 of the ISP is made by using an RR (Router Renumbering) message standardized in the IETF when the HGW 101 is first connected to the Internet 111. A connection processing sequence in the case of first connecting the HGW 101 to the Internet 111 is shown in FIG. 3 and its flowchart is shown in FIG. 4.

When a power source of the HGW 101 is turned on, the HGW 101 checks the contents in the address table 212 (301).

In the case of first connecting the HGW 101 to the Internet 111, the address table 212 is in an initial state where no entry is registered. In this case, the HGW 101 initializes the filtering table 211 prior to starting the forwarding process (302), thereby preventing the occurrence of unexpected packet forwarding. That is, the initialization of the filtering table here denotes addition of an entry #1 in FIG. 5.

The filtering table 211 is shown in FIG. 5. In each entry of the filtering table 211, various comparing conditions regarding the IPv6 packet as a target and the operation (forward or discard) in the case where the entry is matched with the conditions have been defined. If a plurality of entries matched with the conditions exist for one packet, only one entry nearer to the head (top in the diagram) of the filtering table 211 is adapted.

Each field of the filtering table entry 211 will be described. A "#" field denotes a number which unconditionally expresses each entry. A "direction" field is a comparing condition regarding the direction of forwarding the packet and indicates one of the forward (input) from the Internet to the home network, the forward (output) from the home network to the Internet, and both (output/input) of them. An "operation" field shows whether the packets matched with all comparing conditions of the entry are forwarded or discarded. A "protocol" field is a comparing condition regarding which upper layer protocol the data included in the packet belongs to.

As protocols which can be designated, there are the TCP (Transmission Control Protocol), the UDP (User Datagram Protocol), the ICMP (Internet Control Message Protocol), and the NDP. "any" which is matched with an arbitrary protocol can be also designated. A "source address" field shows a comparing condition regarding the source IPv6 address of the packet and includes a value of the IPv6 address to be matched and information showing how many upper bits of the value are needed to be matched. A "source port" field shows a comparing condition regarding a source port number of the packet in the case where the "protocol" field is the TCP or UDP and designates the port number to be matched. When the "protocol" field is other than the TCP or UDP, the "source port" field is not used. By designating the port number, either a protocol (application) through which the user wants to transmit the data or a protocol (application) through which the user does not want to transmit the data can be selected. A "destination address" field and a "destination port" field also show comparing conditions for a destination IPv6 address and a destination port of the packet. A "flag/type" field is used for two objects. When the "protocol" field is the TCP, the comparing conditions regarding a flag of the TCP are designated. When the "protocol" field is the ICMP or NDP, the comparing conditions regarding a message type are designated. An "encryption/authentication" field is a comparing condition showing whether the packet has been encrypted by IPsec or not or whichever may be selected.

In the initialization (302) of the filtering table 211, an entry to completely inhibit the IPv6 packet forward is formed. The entry #1 in FIG. 5 is an entry which is set into the filtering table 211 when the filtering table 211 is initialized by the HGW 101.

After completion of the initialization of the filtering table 211, the program in the HGW 101 is executed, so that a telephone number of a connection destination is obtained from a connection information table 210 (303). Connection to the router 102 of the ISP is made by telephone (311). This construction can be realized by a program or the like loaded in a memory in a software manner and realized by a combination of an arbitrary CPU, a memory, another LSI, and the like in a hardware manner. It will be obviously understood by those with ordinary skill in the art that such a function can be realized by software, hardware, or a combination of them. This is also true for each of the following constructions. In the embodiment, it is assumed that the HGW 101 is rented to the user's home from the ISP in a state where the ISP has previously set the telephone number of the connection destination into the connection information table 210 of the HGW 101. However, the telephone number of the connection destination can be also set to the HGW 101 by a sales shop or the user himself instead of the ISP.

The router 102 of the ISP which received a telephone call specifies the user from the phone number of an originator (321) and starts connection according to the PPP (Point-to-Point Protocol). Although the originator's number indicates the phone number in the embodiment, information which specifies identity of the originator can substitute. The originator's number is confirmed to prevent that the contracted user is charged in the case where the HGW 101 is stolen and the user who is not under contract with the ISP accesses by using the HGW 101.

In the PPP, authentication is made before the connection is established (312). The HGW 101 makes authentication to the connection information table 210 by using a pre-registered key.

After completion of the authentication, a link local address for the dial-up interface 201 of the HGW 101 is determined by the IPV6CP (PPP IPv6 Control Protocol) (313). In the embodiment, the router 102 of the ISP allocates the link local address to the HGW 101. The link local address which is allocated to the HGW 101 by the router 102 of the ISP is changed every connection. This change is made to avoid a situation such that the security is weakened due to a fixed combination of a specific address and a specific authentication key.

When link local address of the HGW 101 is determined, setting which needs the link local address of the HGW 101 as information is made to the filtering table 211. The HGW 101 adds an entry #2 to the filtering table 211 (304). The entry #2 is an entry for enabling the RR (Router Renumbering) message which is used to obtain the network prefix for the home network 103 from the ISP to be transmitted and received between the HGW 101 and the router 102 of the ISP.

In this example, the link local address of the ISP router 102 is assumed to be FE80::0101, the link local address of the HGW 101 is assumed to be FE80::0202, and an RR packet is obliged to make authentication by an AH (Authentication Header) of IPsec. If conditions of a plurality of entries of the filtering table 211 are matched for one packet, only one entry near the head of the filtering table 211 is applied. Therefore, the entry #2 is added to the position nearer to the head of the filtering table 211 more than the entry #1 formed upon initialization. A value "138" of the "flag/type" field is a value of a message type of ICMPv6 showing the RR message.

The router 102 of the ISP notifies the HGW 101 of the network prefix for the home network 103 by the RR message (314). In the embodiment, it is assumed that the HGW 101 is notified of 3FFE:FFFF:1111:1111::/64 as a network prefix for the home network 103.

First, the HGW 101 which received the network prefix for the home network 103 by the RR creates a global address for the LAN interface 202 of the HGW 101 and executes the duplicate address detection due to the NDP. In this example, it is assumed that the global address which is created is 3FFE:FFFF:1111:1111::FFFF. With respect to the link local address of the LAN interface 202, since its creation can be executed in parallel with a process for connecting to the ISP, it is assumed that the address has already been created.

After the global address for the LAN interface 202 was created, the HGW 101 adds entries #4 and #5 which need the global address for the LAN interface 202 as information into the filtering table 211 (305). It is realized by executing the program in the HGW. The entry #4 is an entry which enables the ICMPv6 message to be transmitted from the HGW 101 to the outside of the home. If an error occurs while the IPv6 packet from the outside of the home is forwarded to the home network, the HGW 101 may transmit an ICMPv6 error message to the source of the IPv6 packet which became a cause of the error. The entry which enables the ICMPv6 error message to be transmitted is the entry #4. The entry #5 is an entry for discarding the packet when the IPv6 packet in which the IPv6 address belonging to the home network 103 is set to the source address is transmitted to the HGW 101 from the Internet 111 side.

After the setting of the filtering table 211, the HGW 101 registers the global address set in the LAN interface 202 into the address table 212 for recording the correspondence relationships between apparatus names and the addresses (306). FIG. 6 shows the address table 212. Information regarding the addresses of all of the network apparatuses 104 connected to the home network 103 is recorded in the address table 212. In the embodiment, each time the address is set into the apparatus, the correspondence relationship is registered one apparatus by one. The address of the HGW 101 is also registered in the address table 212 in a manner similar to the addresses of the network apparatuses 104. Each field of the entry in the address table 212 will be described hereinbelow.

A "link local address" field stores the link local address of the network apparatus which has been registered. In the case of the HGW 101, the link local address set in the LAN interface 202 is registered. Similarly, the global address allocated to the apparatus is recorded in a "global address" field. In the case of the apparatus which does not have the global address, 0 is recorded. In the case of the HGW 101, the global address 3FFE:FFFF:1111:1111::FFFF set in the LAN interface 202 is recorded. A "type" field shows a type of apparatus. In the case of the HGW 101, the type is set to "HGW". The apparatus name (character string) allocated to the apparatus is registered in a "name" field. In the case of the HGW 101, a character string "home gateway" is registered. The time when the entry has been first registered in the address table 212 is recorded in a "registration time" field. The same time as that in the "registration time" field is first registered in an "updating time" field and the time is updated each time contents of the entry are confirmed.

The processes 301 to 306 mentioned above correspond to an initializing process for connecting the HGW 101 to the Internet 111 for the first time and obtaining the network prefix for the home network 103.

Subsequently, a procedure for the registration of the apparatus name and the address autoconfiguration in the case of directly connecting the new network apparatus 104 to the home network 103 will be described with reference to FIG. 7. In FIG. 7, a household appliance is used as an example of the network apparatus 104.

When the power source of the network apparatus 104 is turned on or simultaneously with the connection of the network to the network interface of the network apparatus 104, the network apparatus 104 automatically starts an address autoconfiguration sequence. The network apparatus 104 has a "register button" for starting the address autoconfiguration sequence. By pressing the "register button" of the apparatus, the user can intentionally start the address autoconfiguration sequence. In the embodiment, intervention of the user is necessary upon registration of the apparatus name. When the power sources of a plurality of network apparatuses are simultaneously turned on, the user cannot discriminate in which apparatus the apparatus name has been registered, so that a trouble is caused in the registration of the apparatus name. By pressing the "register button", the address autoconfiguration sequence of the network apparatus which the user intends can be started.

When the address autoconfiguration sequence is started, the network apparatus 104 creates the IPv6 link local address (801). It is assumed that an interface ID necessary for creation of the link local address has previously been set in the apparatus. In the embodiment, the link local address of the network apparatus (104) newly connected is assumed to be FE80::222:22FF:FE22:2222. When the user presses the "register button" of the network apparatus (104), the network apparatus transmits an RS (Router Solicitation) message of the NDP protocol to the FF02::2 destination (811). The HGW 101 receives the RS message and executes an apparatus registering process in accordance with a flow of FIG. 8. First, the HGW 101 discriminates whether the source IPv6 address of the RS message has been registered in the address table 212 or not (901).

Since the address table 212 of the HGW 101 is cleared upon initialization and, thereafter, only the HGW 101 remains registered, the processing routine advances to a process 902, thereby urging the user to input the apparatus name. The notification to the user or the input from the user is performed by using the user interface means 105. The user interface means 105 in the embodiment has an input apparatus for displaying a message of the user onto a liquid crystal display screen and enabling the input from the user.

A request for the input of the apparatus name to the user is made by displaying a message such that "The new apparatus was detected. Input the name." onto the display screen of the user interface means 105. When the apparatus name is inputted from the user, in order to avoid the duplicate of the apparatus name, it is confirmed that the same name is not registered in the address table 212. After that, the interface ID of the apparatus is obtained from lower 64 bits of the source IPv6 address of the RS message and the global address is created from the interface ID and the network prefix for the home network 103 distributed from the router 102 of the ISP (903). It is confirmed that the created global address is not registered in the address table 212 (904). The user is requested to confirm the address (905). The confirmation of the address is made to prevent a situation such that when it is necessary to allocate a specific address to the apparatus due to a form of a contract with the ISP or convenience of the application.

After completion of the confirmation of the address by the user, the user is subsequently requested to input the type of apparatus (908). The input from the user is performed by displaying a list of types of the apparatuses onto the display screen of the user interface means 105 and making the user to select the desired apparatus type. The HGW 101 determines set items into the filtering table 211 in accordance with the apparatus type selected by the user. In the HGW 101 in the embodiment, four types such as "PC", "household appliances", "for home network use only", and "others" can be set as types of apparatuses and contents which are automatically set into the filtering table 211 differ.

If the type of network apparatus indicates "PC", as communication between the network apparatuses 104 and the outside of the home, setting of filtering to permit only the TCP communication started by the network apparatuses 104 and inhibit the TCP communication started from the outside of the home is made. In this case, the entries which are added to the filtering table 211 are entries #6 and #7. The entry #6 is an entry for passing the TCP communication in which ACK has been set to a flag among the TCP communication from the outside of the home. The entry #7 is an entry for permitting the TCP communication from a home network apparatus (whose address is assumed to be 3FFE:FFFF:1111:1111:222:22FF:FE22:6666) to the outside of the home. Since the TCP communication with the network apparatuses 104 started from the outside of the home is not matched with the entries #6 and #7, it is discarded by the entry #1.

If the type of apparatus is "household appliance", the communication with the outside using a specific protocol on the TCP is permitted. In the embodiment, an HTTP (Hyper Text Transfer Protocol) is a protocol by which the communication is permitted. In this case, the entries which are added to the filtering table 211 are entries #8 and #9. The entries #8 and #9 are entries in which conditions of a port No. 80 showing the HTTP have been added to conditions of the entries #6 and #7, respectively. If the type of apparatus is "for home network use only", no entry is added to the filtering table 211. Thus, the communication between the network apparatuses 104 and the outside of the home cannot be made.

If the type of apparatus is "others", all communication with the outside is permitted. The entries which are added to the filtering table 211 are entries #10 and #11 (the address of the apparatus is set to 3FFE:FFFF:1111:1111:222:22FF:FE22:8888). The HGW 101 registers a result of the above user input to the address table 212 (911). The entry #2 in the address table 212 in FIG. 6 shows registered contents in the case of the network apparatuses 104 in this example.

The source IPv6 address of the RS message is registered in the link local address field. The global address created in the process 903 is recorded in the global address field. In this example, an address 3ffe:ffff:1111:1111:222:22FF:FE22:2222 which is created from the network prefix for the home network 103 distributed from the router 102 of the ISP and lower 64 bits of the link local address FE80::222:22FF:FE22:2222 of the apparatus is registered. "household appliance" is registered into the type field. The apparatus name (character string) inputted by the user is registered into the name field. In this example, it is assumed that the name "air conditioner" has been registered. The time when the entry has been registered in the address table is recorded into the registration time field. The same time as that in the registration time field is recorded into the updating time field. Each time the RS is received from the network apparatus, the time is updated to the reception time.

After completion of a apparatus registering process 821, the HGW 101 executes a duplicate address detecting process of the NDP in order to confirm that the global address which is set to the newly connected network apparatus 104 is not used in the home network 103 (822). Although each network apparatus 104 should inherently execute the duplicate address detecting process, the HGW 101 in the embodiment executes such a process instead, thereby reducing a processing load of the network apparatus 104. Simultaneously with the duplicate address detecting process (822), an RA (Router Advertisement) message of a reply to the RS message (811) is transmitted to FE80::222:22FF:FE22:2222 (812).

The network apparatus 104 which received the RA message from the HGW 101 creates a global address from contents of Prefix Information Option of the RA message and sets it into the network interface of the network apparatus 104. The above processes relate to a sequence for allocating the address to the new network apparatus and automatically setting the address table 212 and the filtering table 211 of the HGW 101.

The handy apparatus 120 can be notified of the contents of the address table 212 from the HGW 101 via the handy apparatus interface 220. When the user connects the handy apparatus 120 to the handy apparatus interface 220 of the HGW 101, the contents of the address table 212 at this time point are copied to the handy apparatus 120. After that, in the case of communicating with the home network 103 from the handy apparatus 120, the user can designate a communication partner by the apparatus name.

Subsequently, in accordance with a flowchart of FIG. 8, explanation will be made with respect to a fact that in the case where the network apparatus 104 once registered in the address table 212 of the HGW 101 again needs the address autoconfiguration by a reason such as re-activation or the like, by again allocating the global address which has been first allocated to the network apparatus 104, the resetting of the filtering table 211 can be omitted.

The network apparatus 104 starts an address allocating sequence simultaneously with the power-on and transmits the RS message. The HGW 101 which received the RS message searches the source IPv6 address of the RS message from the link local field in the address table 212 (901). Since the entries at the time of the first registration of the apparatus name remain in the address table 212, the processing routine advances to a process 921. The RA message is created from the information in the address table 212 and returned to the network apparatus 104. At the same time, the present time is recorded in the updating time field in the address table 212 (922). By the above processes, since the same global address is certainly set again into the network apparatus 104 to which the address has been allocated before, the resetting of the filtering table 211 is unnecessary.

Subsequently, there will be described allocation of addresses and the autoconfiguration of the address table 212 and the filtering table 211 in the case where the network apparatuses 104 shown in FIG. 1 are connected to the home network 103 via a network outlet 1801.

The network outlet 1801 is connected to the home network 103. A plurality of network apparatuses 104 are connected to the home network 103 via the network outlet 1801. In place of the network apparatuses 104, the network outlet 1801 according to the invention executes the autoconfiguration sequence of the IPv6 address to the network apparatuses 104. By using such a construction, there is obtained an effect such that there is no need to install the LAN interface and the address autoconfiguration function every network apparatus 104.

FIG. 9 shows a functional block diagram of the network outlet 1801 according to the invention. The network outlet 1801 has a plurality of connectors 1903 (in this example, three connectors A, B, and C) for connecting to the network apparatuses 104. As specific examples of the connectors 1903, a socket of a twisted-pair wire and a wireless access point can be mentioned. Communication between each network apparatus 104 and the network outlet 1801 is made without using the IPv6 protocol. In the embodiment, it is assumed that the network apparatuses 104 are monitor cameras and that image data and control signals are communicated without using a special protocol. However, the invention can be applied to the case of making communication by using a protocol such as IEEE1394 (IEEE: The Institute of Electrical and Electronics Engineers, Inc.) or the like. In a protocol conversion processing unit 1904, a process for extracting the data in the IPv6 packet and a process for storing the image data from the network apparatuses 104 into the IPv6 packet are executed. The network apparatuses 104 connected to the network outlet 1801 and a general network apparatus (for example, an information apparatus such as a personal computer or the like) are enabled to communicate by IPv6 via the home network 103.

In an address autoconfiguration processing unit 1902, the address autoconfiguration process regarding a plurality of network apparatuses 104 connected to a network outlet 1901 is proxy-executed. A result of the address autoconfiguration is recorded into a proxy address table 1911 on a nonvolatile storage. The proxy address table 1911 is shown in FIG. 10 and each field will be explained.

In the proxy address table 1911, there is an entry corresponding to each connector 1903 of the network outlet 1801. A "registration" field shows whether the autoconfiguration of the IPv6 address to the network apparatus 104 connected to the corresponding connector 1903 has been finished or not. A "connection" field shows whether the network apparatus 104 is connected to the corresponding connector 1903 and is operating at present or not. When the power source of the network apparatus 104 connected to the connector 1903 is turned on, the "connection" field is automatically set to "Y". When the power source of the network apparatus 104 is turned off or the network apparatus 104 is disconnected from the connector 1903, it is automatically set to "N". A unique ID has been recorded in an "ID" field every connector 1903. The IPv6 address which has automatically been set into the network apparatus 104 connected to the corresponding connector 1903 is recorded in a "global address" field and a "link local address" field.

Figure 12:
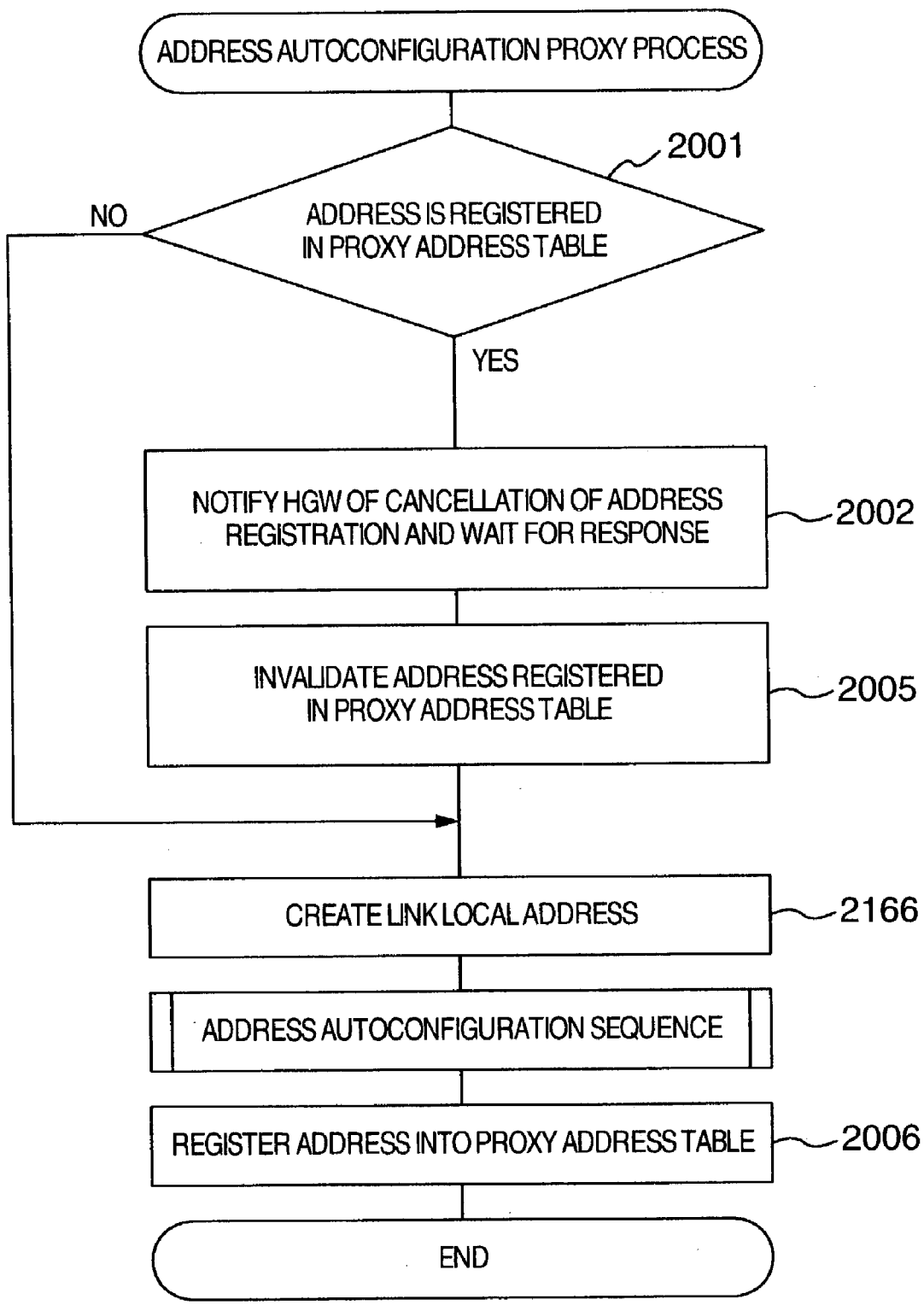
FIG. 12 is a flowchart for an address autoconfiguration proxy process in the first embodiment.

An address autoconfiguration processing sequence in the case where the network outlet 1801 executes a proxy process will be described hereinbelow with reference to FIGS. 11 and 12. The proxy of the address autoconfiguration process to the network apparatus 104 by the network outlet 1801 is started when the user presses the "register button". The "register button" can be provided for each network apparatus 104 or provided for the network outlet 1801. In the embodiment, it is assumed that the network outlet 1801 has a plurality of register buttons corresponding to a plurality of connectors 1903.

When the register button is pressed, the network outlet 1801 obtains the entry of the connector 1903 corresponding to the register button from the proxy address table 1911. Whether the IPv6 address has already been allocated to the network apparatus 104 connected to the connector 1903 or not is discriminated in the "registration" field (2001).

If the IPv6 address has already been allocated, to delete the contents of the address table 212 of the HGW 101 and the filtering table 211, the network outlet 1801 notifies the HGW 101 of the deletion of the address registration (2002). In the embodiment, it is assumed that the deletion of the address registration is notified by a unique protocol on the IPv6 protocol. A standard protocol such as the Dynamic DNS (Domain Name System) may be used.

The HGW 101 deletes the entry corresponding to the deletion-notified address from the address table 212 and the filtering table 211 (2003). The source IPv6 address of the packet which is notified of the deletion of the address registration is searched from the address table 212 and the entry to be deleted is determined. The entry including the same address as that of the global address field of the entry to be deleted in the address table 212 becomes a target of deletion from the filtering table 211.

After completion of the deletion from the address table 212 and the filtering table 211, the HGW 101 responds to the network outlet 1801 (2004). When there is a response from the HGW 101, the network outlet 1801 sets "N" into the "registration" field of the corresponding entry in the proxy address table 1911, thereby invalidating the contents of the entry (2005).

Subsequently, a link local address in which the data recorded in the "ID" field of the entry is set to lower 64 bits is created (2166) and the address autoconfiguration sequence is started. When the allocated address is notified by the RA message from the HGW 101, the network outlet 1801 searches the destination IPv6 address of the PA message from the "link local address" field in the proxy address table 1911 and records it into the "global address" field of the corresponding entry (2006). The above explanation relates to a flow of the-process for automatically setting the address table 212 and the filtering table 211 in an interlocking relational manner with the address allocation.

With respect to a realizing method of the network outlet 1801, it is also possible to use a method wherein a unique interface ID to create the link local address is not provided for the network outlet 1801 but a unique ID has previously been set every network apparatus 104. Each of a network outlet X 1801 and a network outlet Y 1801 in FIG. 1 are the network outlet 1801 according to such a method. The network outlet 1801 of this method uses the ID set in each network apparatus 104 in order to create the IPv6 address and proxy-executes the address autoconfiguration sequence. There is a feature such that by providing the unique ID for every network apparatus 104, even if the location where the network apparatus 104 is used is changed in the home, the same IPv6 address is always allocated to the same network apparatus 104, so that the resetting of the filtering table 211 can be omitted. Description will be made with reference to FIG. 13 about address autoconfiguration sequence of the network outlet 1801 according to the invention in the case where the location of the network apparatus 104 is changed.

Figure 13:
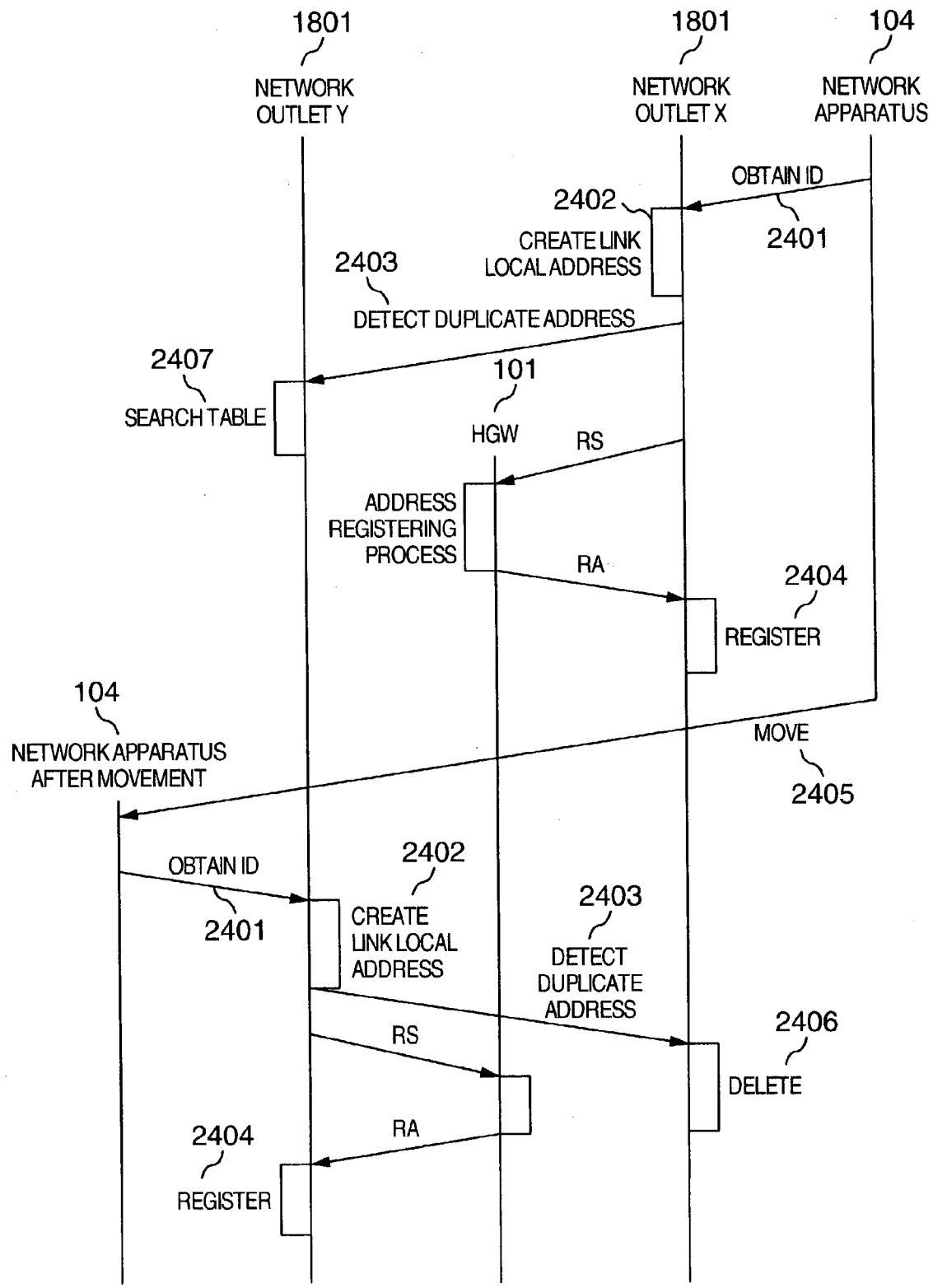
FIG. 13 is an address autoconfiguration sequence diagram in the case where a network apparatus is moved.

The sequence of FIG. 13 shows a state where, first, the network apparatus 104 is connected to the network outlet X 1801, moved thereafter, and connected to the network outlet Y 1801. It is assumed that the network apparatus 104 as a target has not been connected to the home network 103 before. When the network apparatus 104 is connected to the connector 1903 and the power source is turned on, the network outlet X 1801 obtains the ID of the network apparatus 104 and registers it into the "ID" field in the proxy address table 1911 (2401).

The network outlet X 1801 creates the IPv6 link local address having the ID obtained from the network apparatus 104 (2402). In the embodiment, the unique ID which has been preset in each network apparatus 104 has a length of 64 bits and is used as lower 64 bits of the IPv6 link local address.

The network outlet X 1801 executes a duplicate address detecting process regarding the formed link local address. In the duplicate address detecting process, an NDP packet for duplicate address detection is transmitted to the home network 103 in accordance with the specification of the NDP (2403). The network outlet Y 1801 which received the NDP packet for duplicate address detection searches the proxy address table 1911 and confirms that the IPv6 address as a target of the duplicate address detection does not exist in the proxy address table 1911 (2407). Subsequently, the network outlet X 1801 executes the address autoconfiguration sequence and the network apparatus 104 can communicate.

Subsequently, the network apparatus 104 is moved in the home and connected to the network outlet Y 1801 different from the original network outlet X 1801 (2405). The network outlet Y 1801 obtains the ID from the network apparatus 104 (2401), forms the IPv6 link local address (2402), and detects the duplicate address (2403). The network outlet X 1801 which received the NDP packet for duplicate address detection searches the IPv6 address as a target of the duplicate address detection from the proxy address table 1911. In the case of this example, the information obtained when the network apparatus 104 is connected before remains in the proxy address table 1911. The network outlet X 1801 deletes the contents of each of "ID", "link local address", and "global address" of the corresponding entry in the proxy address table 1911 and sets "registration" to "N" by regarding that the network apparatus 104 has been moved.

Subsequently, the network outlet Y 1801 proxy-executes the address autoconfiguration sequence. Since the information registered by the network outlet X 1801 remains in the HGW 101, the processing routine advances to the process 921 in FIG. 8. The RA message based on the registered information is returned from the HGW 101 to the network outlet Y 1801. Thus, the IPv6 address which has already been registered is again allocated to the network apparatus 104. There is, consequently, an effect such that it is unnecessary to reset the address table 212 and the filtering table 211 of the HGW 101.

As described above, by using the network system according to the invention shown in the embodiment, it is possible to provide the network which automatically executes the setting of the correspondence relationships between the addresses and the apparatus names and the setting of the packet filtering in an interlocking relational manner with the address autoconfiguration of the network apparatuses.

In the embodiment, by using the network outlet 1801 also to the network apparatus 104 which does not have the IPv6 function, the setting of the correspondence relationships between the apparatus names and the addresses and the autoconfiguration of the filtering which are interlocked with the address allocation can be realized.

Further, there is a feature such that in the case where the unique ID is provided for each network apparatus 104 and the network outlet 1801 proxy-executes the address autoconfiguration process, even if the connecting location of the network apparatus 104 to the home network 103 is changed, the same IPv6 address is always allocated to the same network apparatus, so that the updating of the filtering table 211 can be minimized.

The second embodiment of an address autoconfiguration according to the invention will now be described.

The HGW 101 in the first embodiment has the user interface means 105 in order to make the user to input the type and name of the apparatus in the address autoallocation sequence to the network apparatuses 104. The HGW 101 in the second embodiment does not have the user interface means. In this embodiment, the apparatus name and its type are preliminarily registered in each network apparatus 104 and the HGW 101 obtains the apparatus name and the apparatus type from each network apparatus 104. There is, consequently, a feature such that the filtering table 211 can be automatically created without the input from the user.

Figure 14:
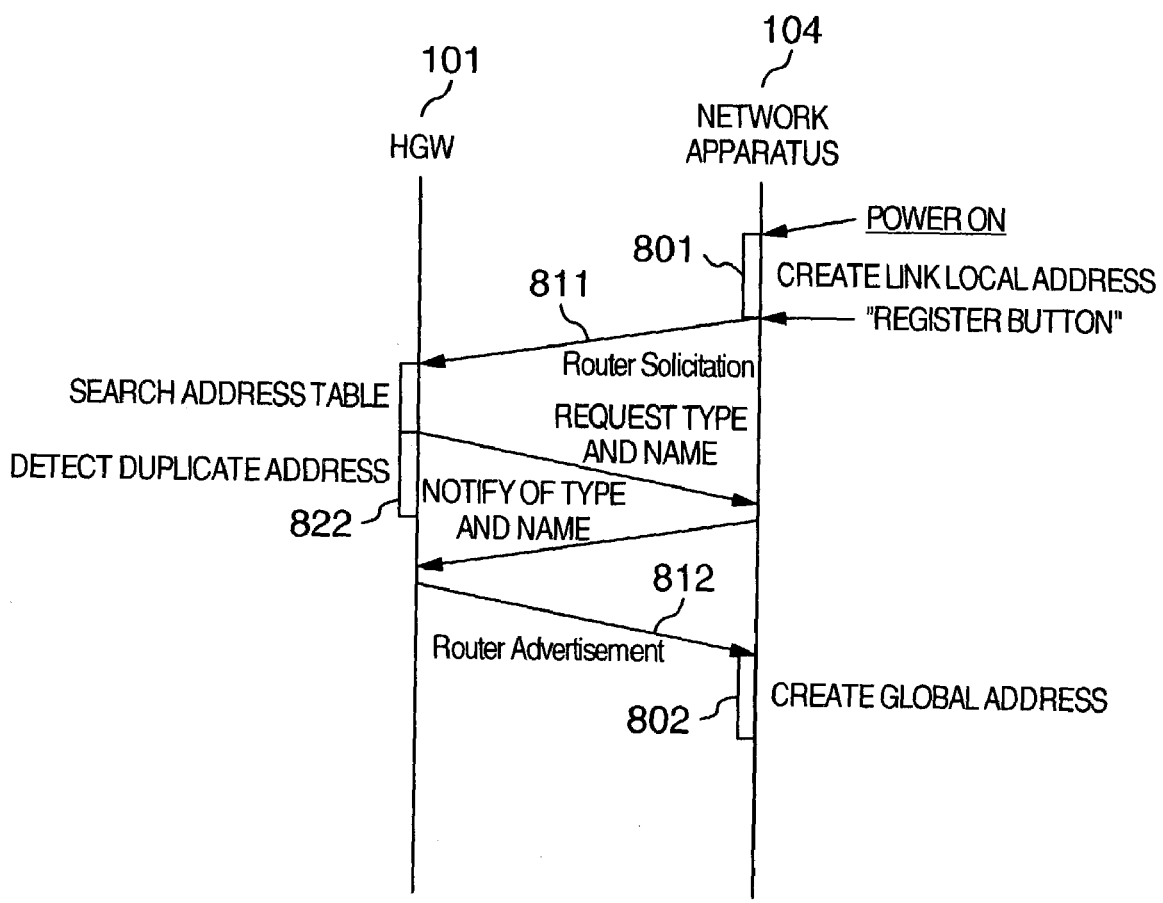
FIG. 14 is an address autoconfiguration sequence diagram in the second embodiment.
Figure 15:
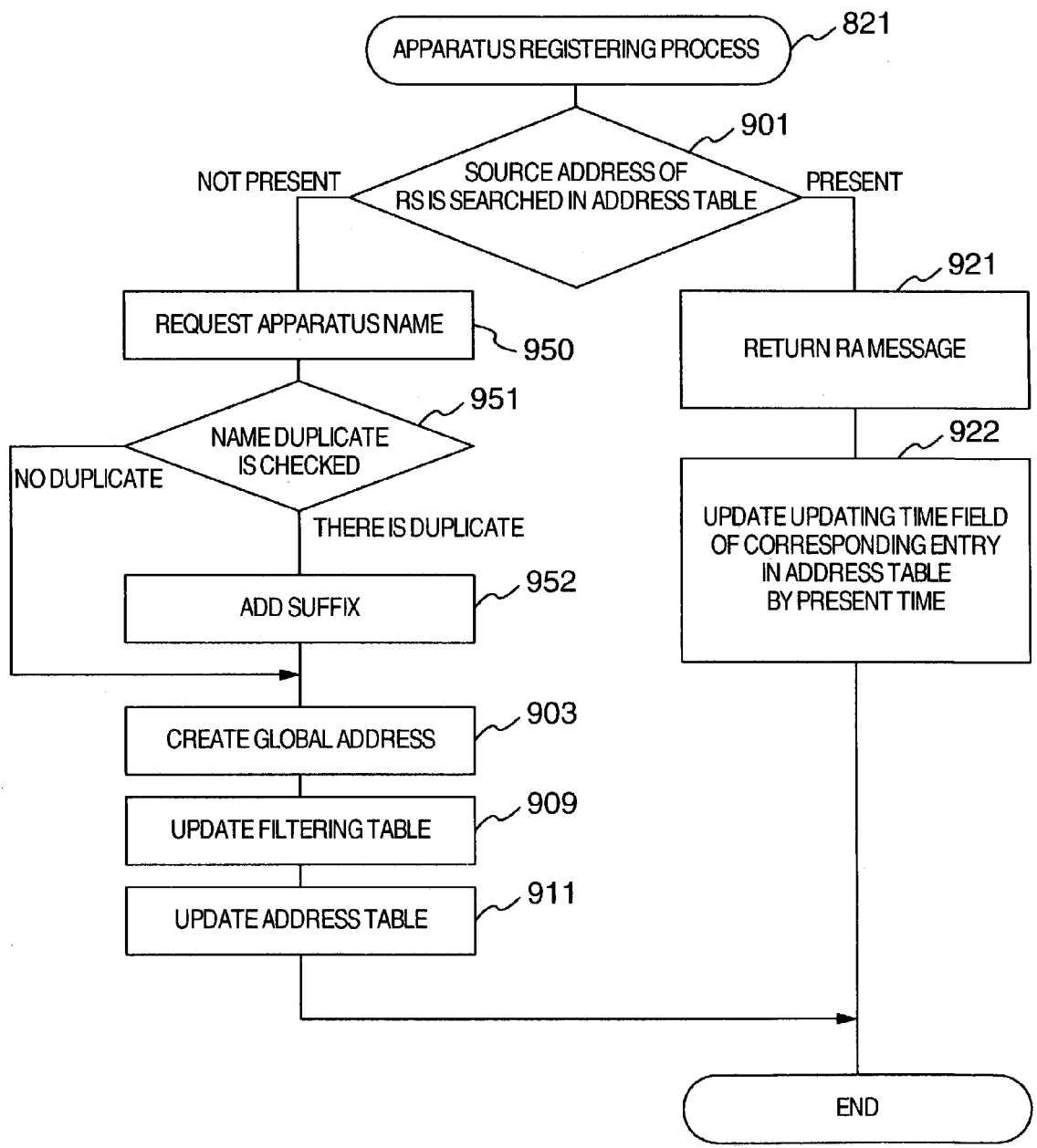
FIG. 15 is a flowchart for an address autoconfiguration proxy process in the second embodiment.

The address autoconfiguration sequence in this embodiment is shown in FIG. 14 and its flowchart is shown in FIG. 15. An opportunity when the network apparatuses 104 starts the address autoconfiguration sequence is similar to that in the first embodiment. The HGW 101 which received the RS message searches the source IPv6 address of the RS message from the address table 212 (901). If it is not registered yet, the HGW 101 requests the apparatus name and its type to the source IPv6 address of the RS message (950). In the embodiment, although the unique protocol on the IPv6 is used for inquiry, a standard protocol such as the ICMP Node Query message or the like can be used. The network apparatus which received the inquiry message notifies the source IPv6 address of the request message of the apparatus name and its type. The apparatus name and its type have been recorded in the nonvolatile storage (for example, Read Only Memory) of each network apparatus 104.

The HGW 101 which received the apparatus name and its type checks that the same apparatus name is not registered yet in the address table 212 (951). If the apparatus name is duplicated, the number of one or two digits is added as a suffix to a position behind the apparatus name, thereby avoiding the duplicate of the apparatus name (952). To create such a number, it is possible to use a method wherein random numbers or sequential numbers which are managed by the HGW or the like are utilized. The HGW 101 registers the apparatus name and its type into the address table 212 and automatically creates the filtering table 211 on the basis of the obtained "type" in a manner similar to the first embodiment (909).

The network outlet 1801 in the embodiment answers the apparatus name and its type in place of the network apparatus 104 in response to the request for the apparatus name and its type from the HGW 101 which does not have the user interface means 105. The installing location (for example, "living room", "bed room on the 2nd floor", or the like) of the network outlet 1801 is previously registered in the network outlet 1801 and a combination (for example, "living room A") of the installing location and the identifier ("A", "B", or the like) of the connector is used as an apparatus name. As for the type, one (for example, "household appliance") of the "types" used in the first embodiment is previously registered into the network outlet 1801. There is a feature such that by registering "type" into the network outlet 1801, the contents of the filtering table 211 which is created in the HGW 101 can be determined at every installing location of the network outlet 1801.

If the ID has previously been registered for every network apparatus 104, the network outlet 1801 in the first embodiment obtains the ID from the connected network apparatus 104. In the embodiment, it is assumed that if the ID has been registered in the network apparatus 104, the apparatus name and its type have also been registered in every network apparatus 104. The network outlet 1801 obtains the apparatus name and its type together with the ID. Fields to record the apparatus name and its type are added to the proxy address table 1911 (FIG. 10) and the obtainment, recording, and deletion are executed at the same timing as that of the ID. When the request for the apparatus name and its type is made by the HGW 101, the network outlet 1801 searches the "link local address" field in the proxy address table 1911 by the destination IPv6 address of the request message, obtains the apparatus name and its type of the corresponding entry, and notifies the HGW 101 of them.

If the network outlet 1801 in the embodiment is used, it is possible to obtain an effect such that also in the case of the address allocation using the HGW 101 which does not have the user interface means 105, even if the network apparatus 104 is moved, by allocating the same address, the resetting of the filtering table 211 can be omitted.

As mentioned above, in the HGW 101 in the second embodiment, the filtering table 211 can be automatically created by directly obtaining the information necessary for automatically creating the filtering table 211 from each network apparatus 104. Further, there is also a feature such that troublesomeness such that the user inputs the apparatus name and the like can be omitted and there is no need to provide the user interface means 105 for the HGW 101.

There is also a feature such that by using the network outlet 1801 in the embodiment, even in the case of using the HGW 101 of the embodiment which does not have the user interface means 105, the network outlet 1801 responds in place of the network apparatus 104 in response to the request for the apparatus name and its type from the HGW 101, so that the filtering table 211 can be automatically created.

Further, there is also a feature such that by setting the installing location of the network outlet 1801 to the apparatus name, even if the apparatus name is automatically determined, the user can easily specify the communication partner and since the "type" is set to every network outlet 1801, the entry in the filtering table 211 which is created can be changed in accordance with the installing location of the apparatus.

The third embodiment according to the invention will now be described.

The network apparatus 104 in the embodiment has a template for recording into the filtering table 211 of the HGW 101. In a manner similar to the second embodiment, when the HGW 101 inquires the apparatus name and its type, the network apparatus 104 also transmits the template together with the apparatus name and its type. A fundamental structure of the template is the same as that of the entry in the filtering table 211 (FIG. 5). However, as values which the destination address field and the source address field can have, there are three kinds of a value: a specific address; "any", or a value showing "replacement with the global address of the network apparatus itself". The HGW 101 registers the notified template into the filtering table 211. At this time, if the value showing "replacement with the global address of the network apparatus itself" has been stored in the field of the template, the corresponding field of the template is replaced with the global address which is allocated to the network apparatus 104 and it is registered into the filtering table 211.

Before the template notified from the network apparatus 104 is registered into the filtering table 211, in order to check the validity of the template, the HGW 101 compares it with an anti-template which has previously been registered in the HGW 101. The anti-template is a template such that the registration into the filtering table 211 is improper because of security or the like. An example of the anti-template is, a template such that arbitrary communication from the outside to the network apparatus 104 is permitted. The anti-template in such a case has an entry in which "direction" is "output/input", "operation" is "forward", "destination address" is "replacement with the global address of the network apparatus", all of the other fields are "any". If the template notified from the network apparatus 104 coincides with this anti-template, the HGW 101 does not register the entry which is created from the template into the filtering table 211.

There is a feature such that by previously registering the anti-template into the HGW 101, the communication of the home network 103 can be restricted irrespective of contents of the template registered in each network apparatus 104.

In the home network 103 using the HGW 101 in the embodiment, by registering the template into the network outlet 1801, even if the template is not provided for the network apparatus 104, the filtering table 211 can be automatically created.

As mentioned above, according to the embodiment, there is a feature such that since each network apparatus 104 has the template, the filtering table 211 can be automatically created in an interlocking relational manner with the address allocation and the optimum filtering conditions are registered into the HGW 101 for every network apparatus 104. There is also a feature such that by using the anti-template, the filtering conditions as a whole home network 103 can be used in preference to the filtering conditions of each network apparatus 104.

Naturally, the invention is not limited to the foregoing embodiment but can be modified and embodied within the scope without departing from the essence irrespective of the application fields. For example, the invention can be applied to other protocols without being limited to the IPv6 protocol so long as it can be embodied.

As described above, the network system in which by using the address autoconfiguration method according to the invention, the network system in which the setting of the correspondence relationships between the apparatus names and the addresses and the setting of the filtering rule are automatically executed in an interlocking relational manner with the address autoconfiguration can be provided to the user having no special knowledge regarding the network.

What is claimed is:

1. An internetwork forwarding apparatus, in a network in which a plurality of network apparatuses are mutually connected, wherein:
   the addresses are automatically allocated to said plurality of network apparatuses on the basis of an address autoconfiguration method wherein:
      said network has at least one internetwork forwarding apparatus which connects an external network and said network,
      said internetwork forwarding apparatus automatically allocates addresses to said plurality of network apparatuses connected to said network,
      names of said network apparatuses, the addresses automatically allocated to said network apparatuses, and types of said network apparatuses are recorded into a nonvolatile storage medium, and
      a filtering rule of a network packet of said internetwork forwarding apparatus is automatically created on the basis of recorded information,
   the names of said network apparatuses, the addresses automatically allocated to said network apparatuses, and the types of said network apparatuses are recorded into said nonvolatile storage medium,
   the filtering rule of said network packet is automatically created,
   the names of said network apparatuses and the types of said network apparatuses which were held in said network apparatuses are obtained via said network, and
   the filtering rule of said network packet is automatically created on the basis of the obtained information.

2. A network system having the internetwork forwarding apparatus according to claim 1.

3. A home network using the network system according to claim 2.

4. A network apparatus, in a network in which a plurality of network apparatuses are mutually connected, which holds the names and the types of said network apparatuses and notifies the internetwork forwarding apparatus of the names and the types of said network apparatuses in response to a request from the internetwork forwarding apparatus, wherein:
   addresses are automatically allocated to said plurality of network apparatuses on the basis of an address autoconfiguration method, wherein:
      said network has at least one internetwork forwarding apparatus which connects an external network and said network,
      said internetwork forwarding apparatus automatically allocates addresses to said plurality of network apparatuses connected to said network,
      names of said network apparatuses, the addresses automatically allocated to said network apparatuses, and types of said network apparatuses are recorded into a nonvolatile storage medium, and
      a filtering rule of a network packet of said internetwork forwarding apparatus is automatically created on the basis of recorded information,
   the names of said network apparatuses, the automatically allocated addresses, the types of said network apparatuses are recorded into a nonvolatile storage medium,
   the filtering rule of said network packet is automatically created,
   the names of said network apparatuses and the types of said network apparatuses which were held in said network apparatuses are obtained via said network, and
   the filtering rule of said network packet is automatically created on the basis of the obtained information.

5. A network apparatus according to claim 4, wherein the filtering conditions of the network packet to be applied to communication of said network apparatus are held and said filtering conditions are notified in response to a request from the internetwork forwarding apparatus.

6. A network apparatus connecting apparatus, wherein the plurality of network apparatuses and the network are connected, the types of said plurality of network apparatuses are held, a different apparatus name is created to every said network apparatus, and the apparatus names and the apparatus types are notified in response to a request from the internetwork forwarding apparatus, wherein:
   addresses are automatically allocated to said plurality of network apparatuses on the basis of an address autoconfiguration method, wherein:
      said network has at least one internetwork forwarding apparatus which connects an external network and said network,
      said internetwork forwarding apparatus automatically allocates addresses to said plurality of network apparatuses connected to said network,
      names of said network apparatuses, the addresses automatically allocated to said network apparatuses, and types of said network apparatuses are recorded into a nonvolatile storage medium, and
      a filtering rule of a network packet of said internetwork forwarding apparatus is automatically created on the basis of recorded information,
   the names of said network apparatuses, the automatically allocated addresses, the types of said network apparatuses are recorded into a nonvolatile storage medium,
   the filtering rule of said network packet is automatically created, the names of said network apparatuses and the types of said network apparatuses which were held in said network apparatuses are obtained via said network, and the filtering rule of said network packet is automatically created on the basis of the obtained information.

7. A network apparatus connecting apparatus according to claim 6, wherein:

filtering conditions of the network packet which are applied to communication of said network apparatus are obtained from said connected network apparatus and held, and said filtering conditions are notified in response to a request from said internetwork forwarding apparatus.

8. A network system, wherein the network apparatus is connected to the network by the network apparatus connecting apparatus according to claim 7.

9. A home network using the network system according to claim 8.

10. A network system, wherein a network apparatus is connected to a network by a network apparatus connecting apparatus, wherein the network apparatus connecting apparatus:
stores the types of a plurality of network apparatuses, creates a different apparatus name for each network apparatus, and
provides the apparatus names and the apparatus types in response to a request from an internetwork forwarding apparatus, wherein:
addresses are automatically allocated to said plurality of network apparatuses on the basis of an address autoconfiguration method, wherein:

said network has at least one internetwork forwarding apparatus which connects an external network and said network, said internetwork forwarding apparatus automatically allocates addresses to said plurality of network apparatuses connected to said network, names of said network apparatuses, the addresses automatically allocated to said network apparatuses, and types of said network apparatuses are recorded into a nonvolatile storage medium, and a filtering rule of a network packet of said internetwork forwarding apparatus is automatically created on the basis of recorded information, the names of said network apparatuses, the automatically allocated addresses, the types of said network apparatuses are recorded into a nonvolatile storage medium the filtering rule of said network packet is automatically created, the names of said network apparatuses and the types of said network apparatuses which were held in said network apparatuses are obtained via said network, and the filtering rule of said network packet is automatically created on the basis of the obtained information.

11. A home network using the network system according to claim 10.

* * * * *